Dec. 24, 1929.  J. H. TAYLOR  1,741,041
PULVERIZED COAL TRANSPORT SYSTEM
Filed March 25, 1921   5 Sheets-Sheet 1

Inventor
James Hall Taylor
By Brown, Boettcher & Dienner
Att'ys

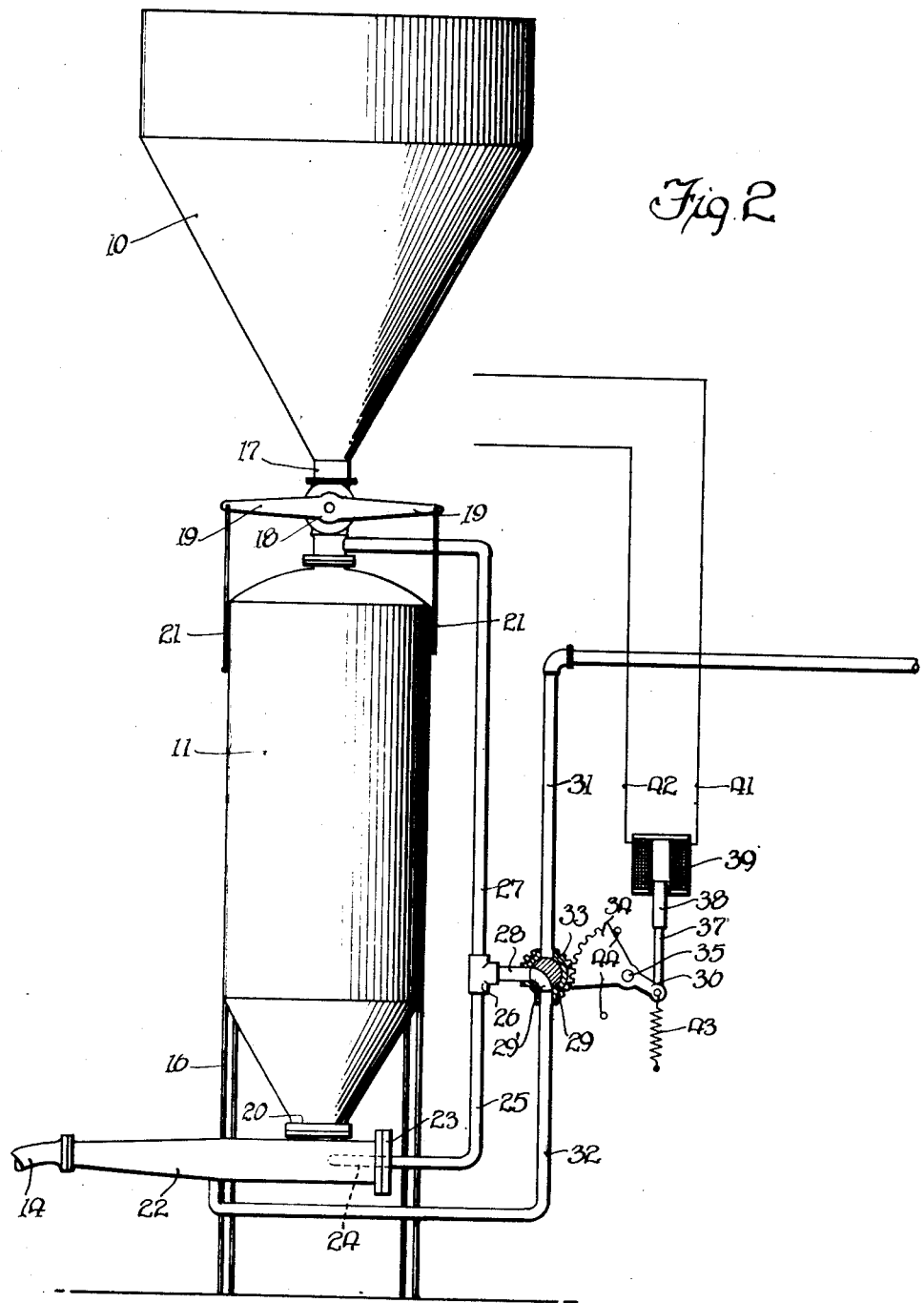

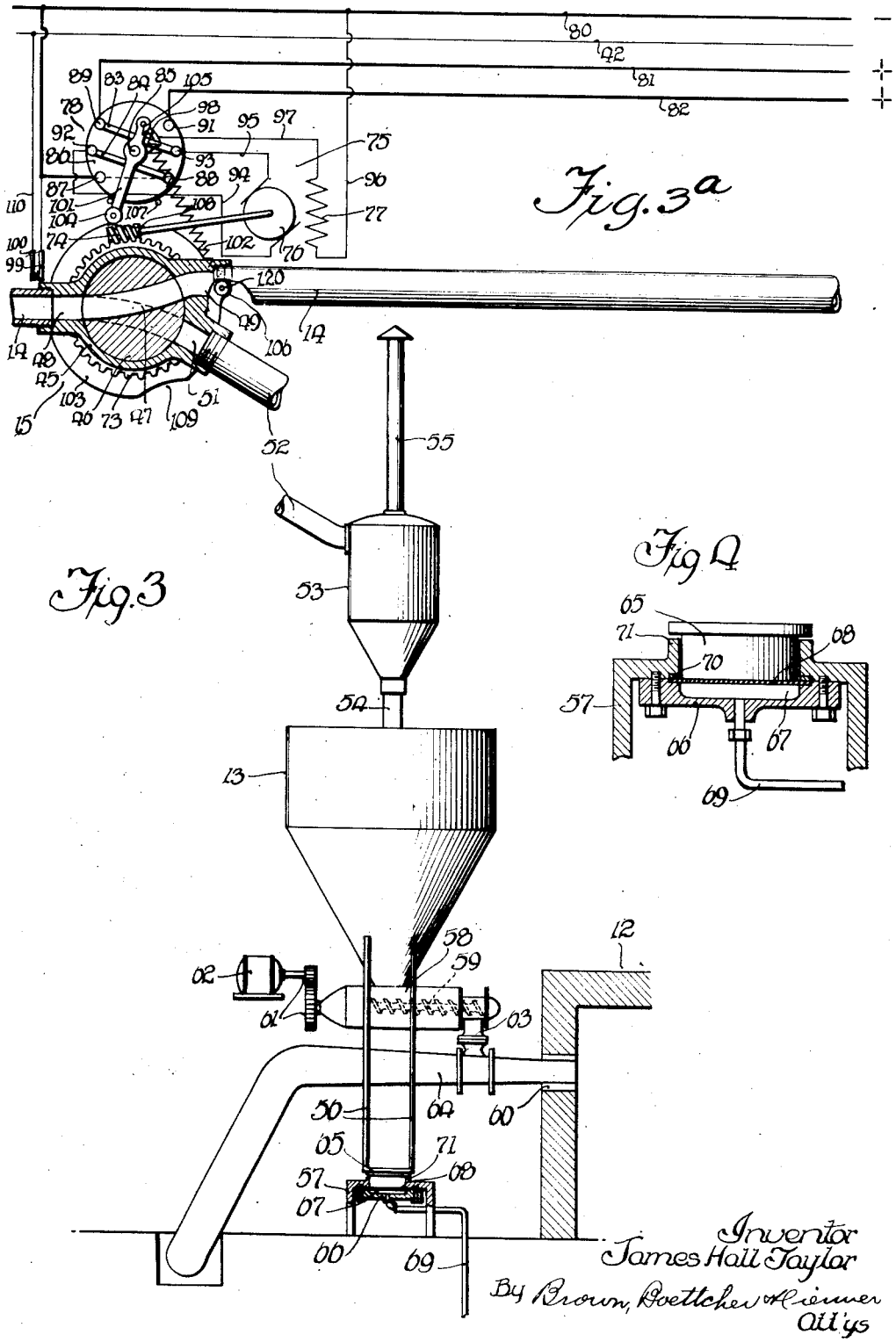

Dec. 24, 1929.          J. H. TAYLOR          1,741,041
PULVERIZED COAL TRANSPORT SYSTEM
Filed March 25, 1921          5 Sheets-Sheet 4
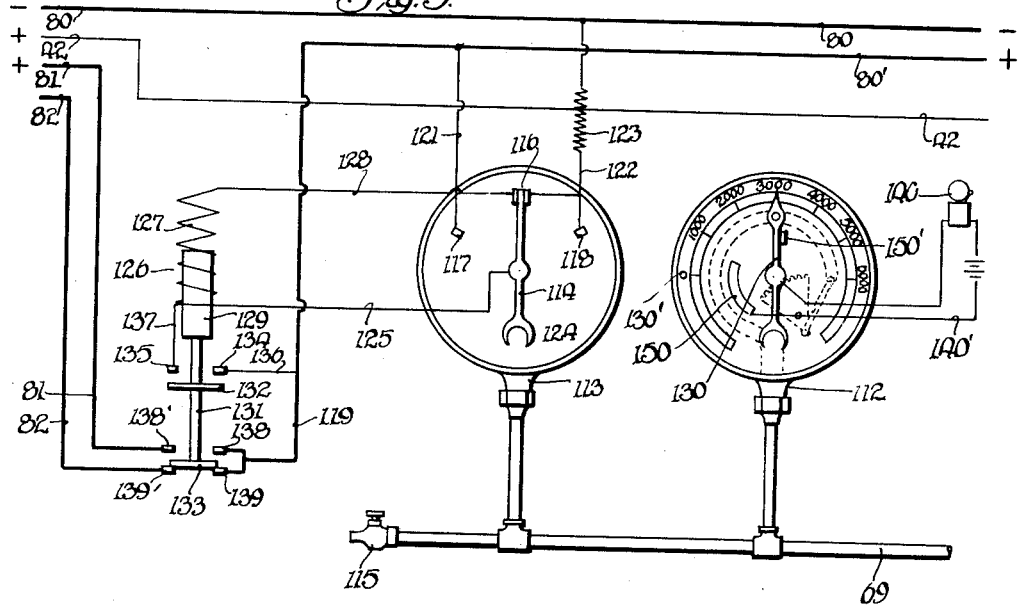
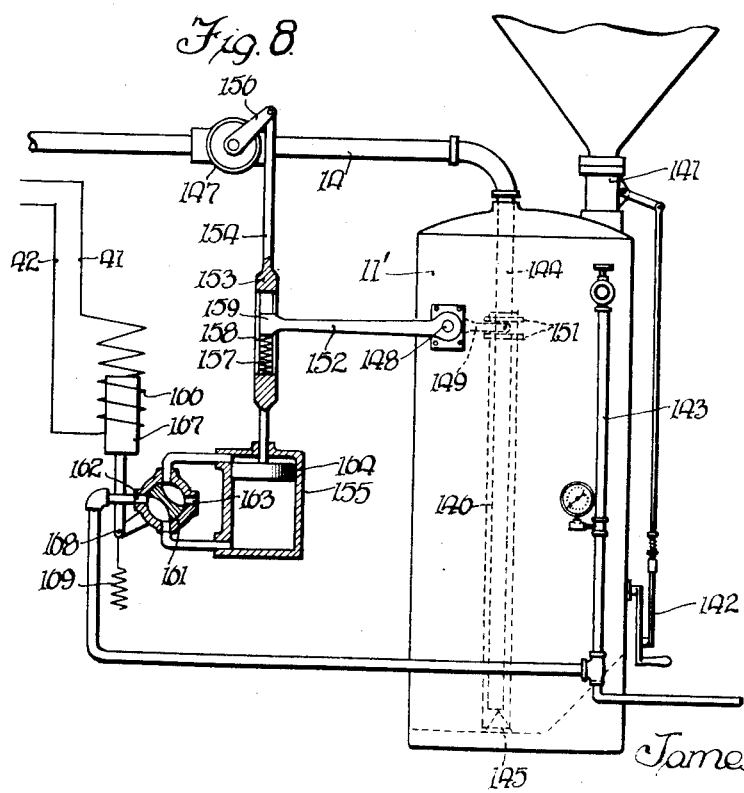
Inventor
James Hall Taylor
By Brown Boettcher & Cienner
att'ys Dec. 24, 1929.  J. H. TAYLOR  1,741,041
PULVERIZED COAL TRANSPORT SYSTEM
Filed March 25, 1921   5 Sheets-Sheet 5
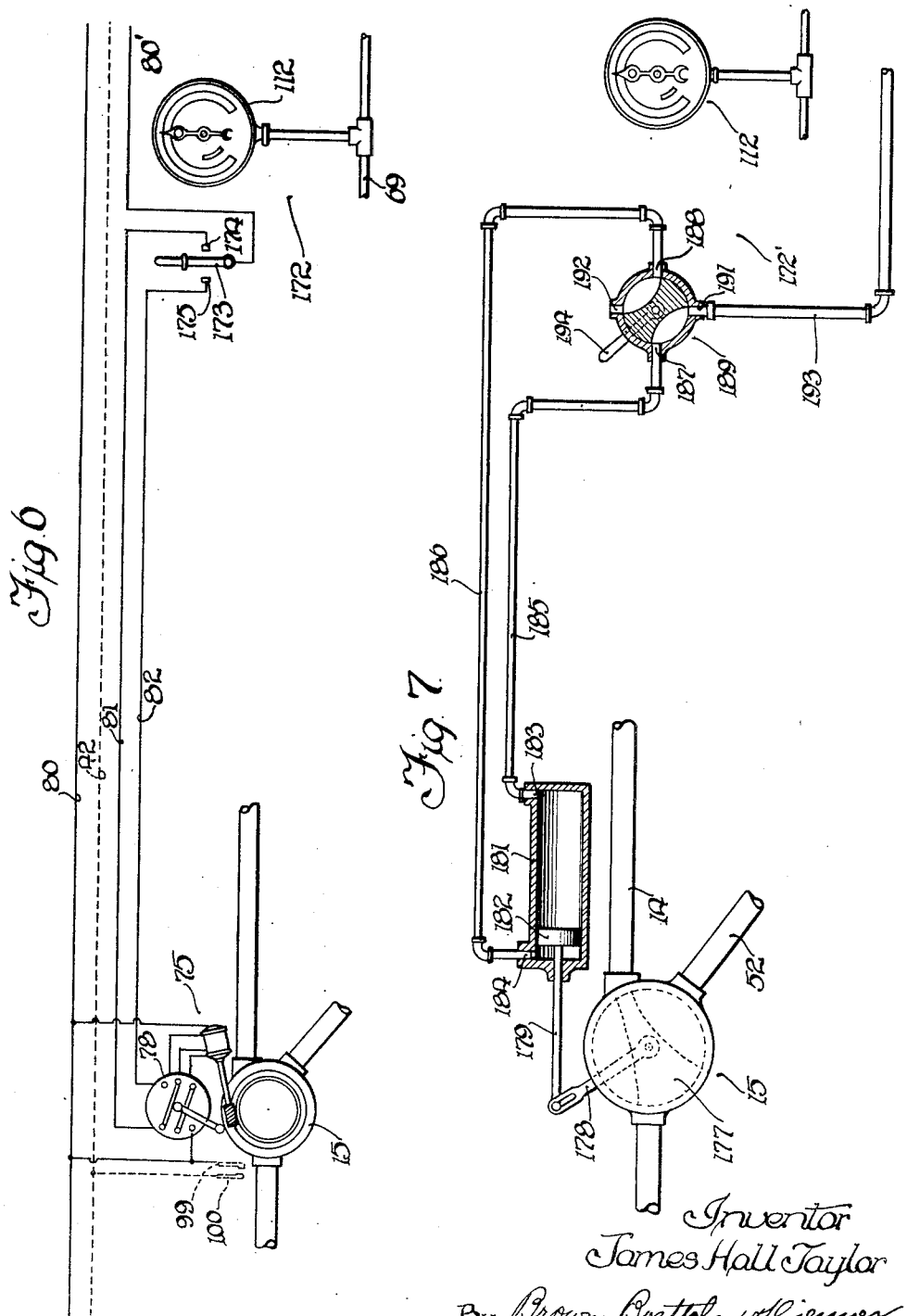
Inventor
James Hall Taylor
By Brown, Boettcher & Diemer
Att'ys Patented Dec. 24, 1929

1,741,041

UNITED STATES PATENT OFFICE

JAMES HALL TAYLOR, OF CHICAGO, ILLINOIS, ASSIGNOR, BY MESNE ASSIGNMENTS, TO FULLER LEHIGH COMPANY, A CORPORATION OF DELAWARE

PULVERIZED-COAL-TRANSPORT SYSTEM

Application filed March 25, 1921. Serial No. 455,390.

The present invention relates to air transport systems, particularly for pulverized coal, although the essential features of my invention may be embodied in air transport systems for other materials as well.

Owing to the extreme difficulty of handling pulverized coal in the open air, compressed air transport systems have been developed consisting of closed conduits and passages through which the pulverized coal is conveyed by compressed air, such as from a storage chamber to a bin or hopper at the point of consumption. The present invention has reference to such a transport system wherein there are a plurality of furnaces or other points of consumption to which the coal is to be selectively transported in accordance with the demands of these furnaces. Each of these furnaces generally has an individual bin from which the coal is withdrawn as required, although a number of these furnaces may draw from a common receiving bin, the transport system being arranged to connect each and all of these receiving bins with the source of supply in such a manner that when one of the bins requires a replenishing charge of coal the proper charge or quantity of coal can be withdrawn from the source of supply and immediately directed to the proper bin which is to receive the charge.

One of the fundamental objects of the present invention involves the provision of improved means for accurately determining the quantity of coal within each individual receiving bin. The methods and means heretofore employed have been very susceptible to error, arising either from the means employed for measuring the charges of coal in the individual bins, or from the human element interposed in the measurement of the charges or in the transmission of this data or information to the operator controlling the system. For example, a prevalent practice heretofore has been to provide an opening in the top of the closed bin which is uncovered when it is desired to measure the charge and through which a measuring rod or weight is inserted. This method is subject to the immediate objection that the measuring rod or weight will penetrate and tend to bury itself in the very soft bed of pulverized coal; and, moreover, a sloping bed of coal entirely precludes accurate measurement in this manner. Furthermore, rather than expend much effort and time in making an accurate measurement of the contents of the bin, if this be possible, the employee will be more likely to merely guess the contents of the bin; the accuracy of the measurement or the fact of whether the contents are measured at all being entirely within the human element of the employee. In a large plant, the charges of coal for the individual receiving bins are initiated from a suitable blowing tank and each charge is directed to the proper bin in accordance with the needs of that bin as transmitted by the employee in charge of the bin. That is to say, when an employee in charge of a furnace assumes that his individual bin requires a replenishing charge of coal he transmits that knowledge including the amount of coal required to the operator in charge of the system who is usually situated at the blowing tank. This transmission may be by telephone of by signaling the needs of that particular bin or by any other manner of communication, all of which, however, are susceptible to the human element and to other error. The possible consequences of error or accident in the determination of the contents of these bins and in the transmission of the requirement of each bin to the controlling operator are of great importance. Pulverized coal is very inflammable, and if the receiving bin should be overloaded and the charge be blown out of the bin under the relatively high velocity of the conveying body of air, the possibility of an explosion, flash-back or other dangerous consequence occurring is very great. Where the contents of the bin are measured by uncovering an opening in the top of the bin and inserting a measuring instrument therethrough there is always the possibility that a charge of coal may be accidentally diverted into the bin at this time with the result that the entire charge would be blown out through this opening. The dangers incident to the foregoing have in some cases even led to the placing of the receiving bins outside of the building or other enclosure for greater safety from loss of life or fire, the coal being withdrawn from these bins back into the building for feeding the furnaces.

In the present system I have obviated these disadvantages and dangers by providing improved apparatus for determining the contents of the bin, having the following characteristics: First, the apparatus affords a continuous determination of the contents of the bin at all times, without necessitating any manual operation in making this determination. Second, the apparatus automatically transmits its determination of the contents of the bin to the point of control of the system—which may be at any remote point—without the inclusion of any manual operation. This point of control to which the apparatus transmits its measured determination of the contents of the bin may be individual to that bin and located in comparatively close proximity thereto, or may be a common point of control for all of the bins of the entire system, and located perhaps at a relatively remote point from the majority of the bins. Third, the apparatus immediately indicates any failure thereof or any abnormal condition developing therein which might possibly result in overloading its respective bin. This apparatus for performing the measured determination of each bin may be employed in conjunction with any manually controlled system, wherein the initiation of the blowing operation at the blowing tank and the directing of the charge to the proper bin is performed manually; or it may be employed in conjunction with an automatically controlled system wherein one or more of the above operations are performed automatically in accordance with the demands of the several bins; both systems being disclosed in the accompanying drawings and detail description. According to the preferred form of the invention this apparatus comprises a body of fluid individual to each receiving bin and subjected to the weight of the pulverized coal therein. From this body of fluid a fluid column is extended to the point where the determination of the contents of the bin is to serve its particular purpose, such as for affording a visual or audible indication of the condition of the bin, or for automatically controlling the apparatus which sets the flow of pulverized coal into motion and directs it to the proper bin. The adaptability of this fluid pressure apparatus to a centralized control for the entire transport system will thus be apparent. By extending these fluid columns from each receiving bin to a centralized or common control point for the entire system the control of the system whether it be manual or automatic is facilitated and rendered more accurate. This common point of control preferably includes the control of the blowing tank which feeds the pulverized coal into the conduit system as well as the control of the shunt valves which direct the coal into the proper bin; although the independent control of these mechanisms from independent control points under the determination of the fluid pressure apparatus is also contemplated. The continuous indication of the feed of coal into any selected bin afforded by the present fluid pressure apparatus is of particular advantage in a manually controlled system as the operator at the control point is thus enabled to actually watch the rate of feed into the bin in addition to noting the contents of the bin so that he is always given ample time to taper down or shut off the flow of coal as the bin begins to reach its capacity.

One of the further objects of the invention is to provide an improved and simplified construction of blowing tank for mixing the compressed air and pulverized coal and blowing the charge through the conveyor conduit. A particular characteristic of this blowing tank is the arrangement whereby after the required charge has been transported through the system the charge of air in the tank operates to scavenge the conveyor conduit of all remaining particles of coal. This characteristic may be had in either the automatically or manually controlled blowing tank. In the automatically controlled system the control mechanism operates to automatically blow charges of coal into the system and to automatically discontinue these blowing operations in accordance with the individual demands of each and every receiving bin in the system. Moreover, this automatic control mechanism operates automatically, as above described, to clean out from the conveyor passages of the system all remaining particles of coal. This scavenging operation may occur prior to or subsequent to the blowing operation, or at both times, as will be apparent from the detail description of the invention.

Another object of the invention is to provide an improved arrangement of switch mechanism for controlling each of the electric motors which operate the shunting valves in the conveyor conduit. One of these valves is situated at each furnace or other point of consumption for either passing the coal on through the system or for diverting the same into the individual bin for that respective point of consumption. The above switch mechanism operates in such a manner as to insure that the valve will be driven by the electric motor to its "through line" and "shunting" positions in the proper sequence in the cycle of the system, and that the valve will be stopped in accurate alignment with its valve ports.

Another object in the automatically controlled embodiment of the invention is to provide improved circuit controlling apparatus cooperating with the previously described apparatus which determines the quantity of coal in each individual bin. As soon as the charge of coal in any of these individual bins reaches a predetermined minimum, at which it is desired to replenish the charge, this circuit controlling apparatus operates through the aforesaid switch mechanism to drive its electric motor in such manner as to place the appropriate shunting valve in proper position for shunting the charge of coal into the exhausted bin. Thereupon the blowing tank begins operation and blows a charge of coal into the bin. When the required charge of coal has been fed into the bin the above circuit controlling apparatus responds by interrupting the operation of the system and restoring the shunt valve to its "through" position.

Other objects concerned with the details of construction and arrangement of the parts and with different modifications of the apparatus will be set forth in the following detail description disclosing a preferred embodiment of the invention. In the drawings accompanying this description:

Figure 1 is a diagrammatic lay-out of the entire system;

Figure 2 is an elevational view of the blowing tank, illustrating the automatic control apparatus therefor in diagrammatic form;

Figure 3 is an elevational view of an individual bin and burner apparatus for one of the furnaces; and Figure 3ª is a schematic figure illustrating diagrammatically in enlarged scale the associated shunting valve, its driving motor, and the automatic switch mechanism for controlling the motor;

Figure 4 is an enlarged detail section of the liquid pressure chamber which supports the bin and its charge of pulverized coal;

Figure 5 is a diagrammatic view of the weight indicating gauge and the circuit controlling apparatus both of which are responsive to the charges of coal in each individual bin;

Figure 6 is a diagrammatic illustration of a manually controlled embodiment of my improved system;

Figure 7 is a similar view of another manually controlled embodiment employing a fluid motor for actuating the shunt valve; and Figure 8 is a view partly in elevation and partly in diagram of a modified arrangement of blowing tank and an associated automatic control mechanism.

The storage point of the system is represented by the storage bin 10 and the blowing tank 11 (Figure 1) where the pulverized coal is stored in readiness for immediate conveyance through the transport system to the point of consumption. These points of consumption are represented by small furnaces 12—12' of any character, which furnaces are equipped with pulverized coal burning apparatus supplied with pulverized coal from bins 13—13'. Only two furnaces 12—12' are shown, but it is to be understood that the system is capable of transporting coal to any number of furnaces or other points of consumption, each of such furnaces or points of consumption having its individual bin 13, or a plurality of such furnaces drawing from a common receiving bin. The coal is conveyed from the blowing tank 11 to the series of furnaces 12 through a conduit 14 which connects serially with each one of an entire group of battery of furnaces. The series connection permits of the entire group of furnaces being supplied from a single conduit, this being the preferred arrangement, although it is within the scope of the invention to extend off branch connections from a main conduit to lead to different sections of the plant, or to extend separate conduits from the blowing tank 11 to lead to these different sections. The series connection along a single conduit, however, permits of a simpler control system and is otherwise advantageous over these other arrangements. This series connection is obtained by interposing novel shunt valve mechanisms 15—15' in the conduit 14 at each furnace 12, each of these shunt valve mechanisms operating either to divert the flow of pulverized coal into its respective bin 13 or to pass the same down through the conduit line to the selected bin to be replenished. To this end the valves 15—15' may be either manually or automatically controlled in accordance with the charges of coal in their respective bins 13—13'.

Referring first to the construction and operation of the blowing tank 11, it will be noted from Figure 2, that this tank is supported in an upright, elevated position upon any suitable construction of frame-work 16. Supported above the blowing tank 11 in any suitable manner is the storage bin 10 which is adapted to intermittently supply the blowing tank 11 through the supply pipe 17. A plug cock or other suitable valve 18 is interposed in this supply pipe for manually controlling the feed of pulverized coal into the blowing tank 11. A pair of arms 19 extend from the valve and support cords or chains 21 by which the valve can be manually operated. The bottom of the tank 11, is coned inwardly to form a feeding outlet 20 for communication with the discharge nozzle or aspirating chamber 22. This chamber is of generally tapering formation and has flanged connection at its outer end with the coal conveying conduit 14 leading to the battery of furnaces. The opposite end of the discharge nozzle or chamber is closed by a removable end head 23 through the center of which enters an air aspirator 24 having a restricted discharge orifice opening into the chamber 22 substantially below the discharge opening 20 of the blowing tank 11. The nozzle 24 is adapted to have communication with a source of compressed air through a pipe 25 which leads up to a T connection 26. Leading from the opposite side of the T connection 26 is a pipe 27 which extends up above the blowing tank 11 and has communication with the feed conduit 17 at a point below the valve 18. The intermediate branch of the T connection 26 has connection through a pipe 28 with the intermediate port of a three-way valve 29. The upper port of the valve 29 has connection with a source of compressed air, or air under pressure from a blower or the like, as may be deemed preferable, through pipe 31, while the lower port of the valve has connection through pipe 32 with the discharge chamber 22 at a point preferably beyond the point at which the pulverized coal is discharged into this chamber. For the manual control system this valve may be operated by any suitable hand lever 30, while for the automatic control system the valve has mounted on its axis a gear or segment 33 which meshes with a relatively large segment 34 pivoted at 35. A rearwardly projecting arm 36 on the segment 34 has pivotal connection through a rod 37 with the core 38 of an electrical solenoid 39. The winding of this solenoid has connection with wires 41 and 42 which constitute a common control circuit for the blowing tank. A tension spring 43 extends downwardly from the arm 38 for attachment to a fixed point, and this tension spring normally tends to hold the valve in the position illustrated with the segment 36 abutting the uppermost stop 44.

In the operation of this blowing tank, a charge of coal is first fed into the tank by the opening of the valve 19. The closing of this valve after the filling of the blowing tank seals the top of the tank against leakage of compressed air up into the storage bin 10. When the charge of coal in any one of the furnace bins 13—13' reaches a predetermined minimum point at which it is desired to replenish the same, a control circuit for that individual furnace is energized to operate the associated valve 15 to place the same in proper position for diverting the supply of coal into the exhausted bin 13. As soon as the valve 15 reaches its proper position for thus diverting the flow of coal the blowing tank control circuit 41—42 is automatically energized, with the consequent pulling up of the solenoid core 38 and oscillation of the valve 29 to place the valve passage 29' between the compressed air supply pipe 31 and the short pipe 28 leading to the T connection 26. It will be noted that when the valve is rotated into this position, the clean-out pipe 32 is blanked or closed by a solid portion of the valve. The flow of air under pressure into the pipe 25 results in a high velocity discharge of air from the air nozzle 24 in the aspirating chamber 22. The admission of this compressed air into the top of the blowing tank through the pipe 27 equalizes the pressures above and below the charge of coal in the tank so that there is no possibility of the compressed air in the discharge chamber 22 from holding or forcing the coal back into the blowing tank. The consequent gravitational discharge of coal from the blowing tank into the discharge chamber 22 results in this coal being picked up by the high velocity discharge of air from the nozzle 24 and carried out through the end of the discharge chamber 22 and along through the conduit 14 to the furnace bin to be supplied. This constant discharge of the pulverized coal continues until the blowing tank 11 is exhausted or until the control circuit 41—42 is de-energized. Upon the de-energization of this control circuit the spring 43 oscillates the segment 34 up into the position illustrated, thereby returning the valve 29 into communication between the pipes 28 and 32 and blanking or closing off the compressed air supply pipe 31. This position of the valve places the clean-out pipe 32 in direct communication with the charge of compressed air trapped in the top of the blowing tank 11, and owing to the constricted orifice in the end of the air nozzle 24 the greater portion of this trapped charge of air seeks immediate discharge through the pipe 32, with the result that a high velocity flow of air is induced in the conduit 14 for a brief period after the closing the valve 29 whereby the conduit 14 is cleaned of all particles of coal lodging therein.

Referring now to the detail construction of one of the valve mechanisms 15, all of these valves being substantial duplicates, it will be noted from Figure 3 that the valve comprises a cylindrical housing 45 in which rotates a cylindrical valve 46. The valve 46 is formed with a curved transverse passage 47 which is adapted to communicate with valve ports 48, 49 and 51 in the valve housing. The port 48 communicates with the entering section of conveyor conduit 14; the port 49 communicates with the outgoing section of the conveyor conduit 14 leading to the valve mechanism of the next furnace; and the port 51 communicates with a downwardly extending conduit 52 which leads down to the furnace bin. Normally, the valve occupies the position illustrated in full lines, but by rotating the valve so as to transpose the ends of the valve passage this valve passage will occupy the position indicated in dotted line for shunting the charge of coal down through the conduit 52. The conduit 52 discharges into the upper end of a centrifugal separator 53 which is connected by its discharge pipe 54 with the top of the closed bin 13. An air discharge pipe 55 extends upwardly from the centrifugal separator 53 for discharging the compressed air which is separated out from the pulverized coal in the separator 53. The bin 13 is supported at its lower end in an open frame 56 which rests upon a table 57. The lower end of the bin 13 discharges into a conveyor chamber 58 in which operates a screw conveyor 59. This screw conveyor is driven from one end through a system of gearing 61 connecting with an electric motor 62, or through any other source of power, and at its other end the conveyor discharges into a feeding chute 63 which opens into the air blast conduit 64 discharging into the furnace 12. The preceding construction of screw conveyor and air blast feed is a conventional practice and is only illustrated diagrammatically. The bin 13 is so supported that the weight of the bin and coal therein is carried in its entirety at the lower end of the frame 56. The screw conveyor mechanism 58—59 and the air conduit 64 are preferably supported on the frame 56, the air conduit 64 having free oscillating motion in an opening 60 in the furnace so as to permit of limited motion of the conduit in accordance with the slight rise and fall of the bin 13 and frame 56. The lower end of the frame 56 is supported on a cylindrical plunger block 65 which is guided in a corresponding bore in the top of the table 57, this plunger block carrying the entire weight of the bin 13 and its contents. Secured to the under side of the table 57 is a flanged plate 66 forming a diaphragm chamber 67 across which is extended a diaphragm 68. The diaphragm is secured to the plate 66 by a ring 70 so that the diaphragm chamber can be assembled and filled as a unit prior to mounting on the table 57. This diaphragm chamber contains a liquid upon which is impressed the weight of the bin 13 and its contents through the plunger block 65 and diaphragm 68. Any suitable non-freezing liquid may be employed. A pipe 69 communicates with this diaphragm chamber and leads away to the apparatus for determining the quantity of coal in the bin, which apparatus I shall hereinafter describe. The table 57 is formed with a raised flange 71 which is adapted to engage with a flange on the plunger block 65 and carry the weight of the bin 13 and its charge of coal if the bin should be overloaded or if the pressure in the pipe line 69 should be lowered to the point where there was danger of the weight of the bin and its contents destroying the diaphragm 68. The flexing of the sheet metal top of the bin 13 is adequate to permit of the slight relative motion between the bin and the separator 53, or the separator may be arranged to move with the bin.

Each shunt valve 15 at each furnace 12 may be operated manually by the attendant in charge of that particular furnace in accordance with the requirements of the bin 13, as indicated by the fluid pressure apparatus responsive thereto; or each of such shunt valves may be remotely controlled from a common control point either manually or automatically through the instrumentality of either a fluid pressure motor, an electrical motor or any other remote controlled means for operating the valve. Referring now to the electric motor form of mechanism for operating the valve 15, as illustrated in Figure 3, it will be noted that mounted on the axis of the valve at one end thereof is a relatively large worm wheel 73 with which meshes a driving worm 74. This worm is driven by a relatively small motor which is designated 75 in its entirety. It is within the purview of my invention to employ a direct current motor, or an alternating current motor of any characteristic in this situation, the present system being shown as employing a direct current motor for simplicity of illustration. This motor comprises an armature 76 and a field 77, the electrical connections of which are separated in such a manner as to permit of convenient reversal of rotation of the motor through the instrumentality of a motor switch 78. This switch is designed to function as a reversing switch for reversing the direction of rotation of the motor, and also as a disconnect switch for shutting off the operation of the motor under the control of the valve 15 when the valve passage 47 is exactly in register with the ports 48 and 49 or, 48 and 51. The electric motor 75 receives current through a main transmission wire 80, upon which potential is always impressed in the operation of the system, and through one or the other of a first selective wire 81 or a second selective wire 82. The three main circuit wires 80, 81 and 82 for the motor 75 are indicated in heavy lines to distinguish them from the blowing tank control wire 42 indicated in light lines. The switch 78 comprises a pair of spaced switch blades 83 and 84, insulated from each other and rotating in unison about a central pivot 85. These switch blades are adapted to contact with a series of six contacts disposed angularly around the circumference of a suitable base 86, it being understood that the illustration of these contacts and the general arrangement of the same is largely diagrammatic. The main transmission wire 80, upon which potential is always impressed, extends down and connects across the bottom of the switch with the two lowermost contacts 87 and 88. The first selective wire 81 connects with the upper left hand contact 89 and the second selective wire 82 connects with the upper right hand contact 91. The two intermediate contacts 92 and 93 connect respectively with the brushes of the armature 76 by way of wires 94 and 95. The field 77 always has the same polarity, and to this end one end of the field is connected through wire 96 with the main circuit wire 80 and the other end of the field is connected through wire 97 with a contact segment 98 adapted to be contacted only by the switch blade 83 and to remain in contact with the switch blade in all positions of the latter. The blowing tank control wire 42 connects with a spring contact 99 which is adapted to cooperate with a second spring contact 100 having connection through wire 110 with the main feeder 80. These two contact springs are located in proper position to have the inner spring 99 engaged by an engaging roller 120 moving with the valve 46, as will be later described. With the wires 80, 81 and 82 having the assumed polarity indicated to the right of the figure, it will be noted that in this position of the switch 78 current impressed on the second selective wire 82 cannot pass through the motor circuit because the switch is out of contact with the contact 91, but current impressed upon the first selective wire 81 is conducted through contact 89, switch blade 83, contact 93 and wire 95 to one brush of the armature. From the other brush of the armature the current flows through wire 94, contact 92, switch blade 84, contact 88, and thence to the main circuit wire 80. At the same time, the field 77 is connected through wire 97, contact 98 and switch blade 83 with the first selective wire 81 from which the motor armature is driven. Consequently, the motor will rotate in a predetermined direction. Oscillation of the switch blades into their other position will operate to first disconnect the first selective wire 81 from the motor circuit and to connect the second selective wire 82 to the motor circuit through contact 91, switch blade 83, contact 92 and wire 94 to the armature. It will be noted that in this position of the switch the direction of flow through the armature is reversed. From the other brush of the armature current will flow through wire 95, contact 93, switch blade 84 and contact 87 to the main wire 80. The field will be disconnected from the first selective wire 81 but will be connected to the second selective wire 82 through continued engagement of the switch blade 83 with the segment 98. Thus the motor will obviously rotate in the reverse direction; that is to say, as soon as current is impressed upon this second selective wire 82.

The switch is automatically controlled by the motion of the valve element 46 through a switch actuating arm 101 and a biasing spring 102. Mounted on the axis of the valve element 46 is a disk 103 with which the arm 101 has cooperation through a roller 104 at its end bearing on the said disk 103. The biasing spring 102 is extended between a co-extensive arm 105 projecting upwardly from the pivot 85 and a lug 106 which rotates with the disk 103 but is displaced from the periphery thereof so as not to interfere with the roller 104. The movement of the switch actuating arm 101 is limited at each side by stop pins 107 and it will be noted that with the switch arm up against one of these stop pins and a solid portion of the disk periphery 103 under the roller 104 the switch is interlocked in its set position. At predetermined points in the periphery of the disk 103 are two arcuate notches 108 and 109 which are adapted to permit the switch actuating arm 101 and roller 104 to oscillate from one side to the other when these notches come in registration therewith.

Assume now that current is impressed on the first selective wire 81. With the switch 78 in the position illustrated, this will result in the motor 75 revolving in a predetermined direction, which direction is such as to rotate the valve element 46 in a counterclockwise direction. At the beginning of the rotation of the valve, the biasing spring 102 is under tension so that there is no possibility of the switch arm accidentally moving through the timing notch 108. As soon as the valve has rotated through a small angular movement, a solid portion of the disk 103 is brought against the roller 104 so that the roller is thereafter locked against motion of the switch. Continued rotation of the valve in this direction gradually revolves the lug or eye 106 over the vertical center line of the valve and down on the other side thereof. This draws the spring 102 across to the other side of the pivot 85 and continued rotation of the lug or eye 106 imposes tension on the spring so that the spring tension tends to oscillate the valve into its other position. This occurs with a snap motion when the arcuate nut 109 has revolved around into register with the roller 104, which occurs exactly at or immediately preceding the instant when the valve passage 47 reaches the position indicated in dotted lines. The snapping of the switch 78 disconnects the motor circuit from the first selective wire 81 and places the motor circuit in reversed connection with the second selective wire 82 for reversed rotation in the other direction. At this time however there is no potential impressed on this second selective wire 82, and consequently, the motor remains inert with the valve in its dotted line position. The lug 106 carries a roller 120 which is positioned to engage the adjacent contact spring 99 when the valve passage 47 comes into register with the ports 48 and 51. The roller 120 closes the blowing tank control circuit 42 through these two contact springs and holds this circuit closed after the valve has ceased motion and until the valve begins its reverse rotation. As soon as potential is impressed upon the second selective wire 82, of the polarity indicated, the motor takes up rotation in a reverse direction with the result that the valve is rotated back to its original position indicated in full lines. During this reverse rotation of the valve the biasing spring 102 and disk 103 control the switch 78 in the same manner as previously described. When the lower end of the tension spring 102 is carried over center it imposes a tension on the switch tending to throw the same into its other position, which occurs with a snap motion when the arcuate notch 108 revolves around into register with the roller 104. The return of the switch 78 to its original position finds the first selective wire 81 dead, or having no potential impressed thereon, and consequently, the motor 75 ceases rotation and remains inert with the valve in the position illustrated. During this return rotation of the valve the roller 120 moves away from behind the contact spring 99 during the initial part of the rotation of the valve and thus the blowing tank control circuit is interrupted and the operation of the blowing tank is stopped before the valve has moved entirely out of register with the ports 48 and 51.

Referring now to the apparatus for determining the quantity of coal in each bin, and with particular reference to the automatically controlled system it will be noted from Figures 4 and 5 that the pipe 69 which extends from the liquid pressure chamber 67 of each individual bin extends to a suitable control point where this pipe has connection with a pressure gauge 112 and a circuit controller 113. Each individual bin of the entire battery of furnaces has its individual pressure gauge 112 and circuit controller 113. These pairs of instruments are either mounted on a separate board individual to each furnace and in proximity thereto, or are mounted on a common control board for the entire battery of furnaces at a common control point for the system. The gauge 112 may be of the Bourdon tube type or of any other preferred form for indicating the pressure of the fluid column in the pipe 69. The dial of this gauge is calibrated to indicate in tons or thousands of pounds the quantity of coal contained in its respective bin 13. The circuit controller 113 may likewise consist of a Bourdon tube instrument arranged to move a pivoted contacting arm 114 in accordance with the pressure variations in the pipe 69. Where the system is manually controlled the circuit controller 113 can be dispensed with entirely; in which case an operator would operate the blowing tank 11 and the shunt valves 15 in any suitable manner in accordance with the conditions of the bins 13 as indicated on the dials of the weight indicating gauges 112. To insure an immediate indication of any loss of pressure in the liquid column, or of any other abnormal condition developing in the system which might result in blowing a charge out of a receiving bin the indicating pointer 130 of the gauge 112 is arranged so as to be movable above and below a zero or balancing point 130′ on the dial of the gauge. The apparatus is so calibrated that the weight of the empty bin and the associated parts supported by the frame 56 will exert just sufficient pressure on the liquid column in the diaphragm chamber and pipe line 69 to maintain the pointer 130 at this zero or balancing position 130′. Any dropping of the pointer below this mark immediately indicates a loss of pressure in the liquid column or other abnormal condition. An audible alarm 140 may be provided in an alarm circuit 140′ having connection with the pointer 130 and with a contact segment 150, the pointer having a brush or the like 150′ for contact with the segment 150. On the end of the pipe 69 is provided a cock 115 for withdrawing or inserting liquid to vary the pressure in calibrating the apparatus. The outer end of the arm 114 on the automatic circuit controller 113 carries contacts 116 which are adapted to engage contacts 117 and 118 located on the instrument in positions corresponding to the minimum predetermined quantity of coal and the maximum predetermined quantity of coal respectively, in the bin. These contacts may be movable to vary the maximum and minimum limits of the charge in the bin. It is, of course, possible to combine the circuit controlling contacts in a gauge such as shown at 112, and this is of course contemplated as coming within the invention; but, owing to the action of the circuit contacts limiting the motion of the contacting arm, I find it more desirable and more accurate to indicate the weight of coal in the bin on a separate instrument which is not hampered in its movement by these electrical contacts. The main power circuit from which current is derived for the operation of the several shunt valve motors 75 and the blowing tank solenoid 39 consists of the main feeders 80 and 80′. The low pressure contact 117 connects through wire 121 with the feeder 80′, and the high pressure contact 118 connects through wire 122 and resistance 123 with the other feeder 80. The contacting arm 114 has electrical connection through its pivot 124 with wire 125 which connects with an electromagnetic contactor or switch 126. This switch comprises a solenoid winding 127, one end of which has connection with the wire 125 and the other end of which has connection through wire 128 with the wire 122 and contact 118. The reciprocating solenoid core 129 carries a stem 131 on which are mounted contacting arms 132 and 133. The upper arm 132 is adapted to bridge a pair of back contacts 134 and 135 for locking-up the solenoid winding 127. The contact 134 connects through wire 136 with the main feeder wire 80′, and the other contact 135 connects through wire 137 with the lower end of the solenoid winding 127. The lower arm 133 plays between upper and lower pairs of contacts 138—138′ and 139—139′. The two right hand contacts 138 and 139 are bridged and are connected jointly to the main feeder 130

80'. The upper left hand contact 138' connects with the first selective wire 81 and the lower left hand contact 139' connects with the second selective wire 82.

In reviewing the circuit connections for the automatically controlled system, it will be apparent from Figure 1 that the main feeder 80 extends throughout the entire system for tapped connection with each circuit controller 113 and each motor switch 78 for every furnace unit in the system. The other feeder 80' has common connection with only the several circuit controllers 113 and their respective magnetic switches 126. Electrical connection is afforded between each magnetic switch 126 and its corresponding motor switch 78 through the first and second selective wires 81 and 82. Extending with the main feeder 80 through the entire system is the blowing tank control wire 42 which is adapted to have common connection with control contacts 99—100 at each shunt valve 15. As previously described, as soon as any one of these valves 15 is moved to substantially its full shunting position the blowing tank control wire 42 is energized, and as soon as such valve begins to move away from this shunting position it operates to de-energize the blowing tank control wire. The other blowing tank control wire 41 connects with the other feeder 80'.

I shall now briefly describe the operation of the entire system. As soon as the charge of coal in any one of the furnace bins 13 reaches a predetermined minimum point, the circuit controller 113 corresponding to that particular bin will actuate its corresponding magnetic switch 126 by closing the circuit through the solenoid winding by way of wire 121, contact 117, hub 114, wire 125, winding 127, wire 128, and wire 122 to the feeder 80. The resulting energization of the solenoid will draw up the core 129 and lock the winding across the two main feeders 80 and 80'. Simultaneously, a positive potential will be impressed upon the first selective wire 81 by the arm 133 contacting with both contacts 138 and 138'. By locking the winding 127 across the main feeders 80—80' through the contact arm 132 retrograde motion of the contact arm 114 away from contact 117 will not release the winding. The resulting positive potential impressed upon the first selective wire 81 flows through the motor switch 78 and through the armature 76 in such a direction as to cause the motor to rotate the valve 46 into its shunting position. As before described, when the valve reaches this position, the motor switch 78 is thrown to break the contact with the first selective wire 81 and to make contact with the second selective wire 82 with the windings of the motor connected to this second selective wire in reversed relation for reverse rotation. Concurrently with the valve 46 reaching its shunting position, the contact springs 99 and 100 are engaged by the roller 120 so as to energize the blowing tank control wire 42. This results in the blowing tank 11 initiating operation and feeding a continuous flow of pulverized coal into the exhausted bin 13. When the charge in this bin reaches a predetermined maximum, the pressure of the liquid column in the pipe line 69 brings the contacting arm 114 over against contact 118 on the circuit controller 113. This short-circuits the solenoid winding 127 and release the solenoid core 129 so that the contact arms 132 and 133 can drop down to their lower positions. The resistance 123 in the wire 122 prevents a dead short being placed across the two feeders 80—80' during the brief instant just before the contact arm 132 drops away from the contacts 134 and 135. When the lower contact arm 133 drops upon the two contacts 139—139', it energizes the second selective wire 82. The motor switch at this time is in position whereby it places the second selective wire 82 in reversed connection with the windings of the motor 75, and consequently, the motor begins rotation in a reversed direction as soon as current is placed on this second selective wire. This rotation of the motor operates to revolve the valve 46 back into its through position. Upon the initial motion of the valve in this direction, the roller 120 moves away from in back of the contact spring 99 and permits the contact springs 99 and 100 to separate and thereby interrupt the blowing tank control circuit. This interruption of the blowing tank control circuit is preferably timed to occur while the valve passage 47 is still partly in register with the entering conduit port 48, so that the final scavenging blast of air can cleanse the conveyor conduit and blow the scavenged particles of coal into the bin before the valve moves out of register. When the valve reaches its through position, the motor switch 78 operates to interrupt the operation of the motor as previously described, and to place the motor winding in connection with the first selective wire 81 in condition for forward rotation as soon as potential is again impressed on this wire. The valve 46 is thus placed in position for the conveyance of charges through the conduit to other bins along the line which may also need charges of coal at this or at a later time. This brings the system back to the starting point at the beginning of the cycle, and from which each cycle is a mere repetition.

In Figure 6 I have illustrated in diagrammatic form a manually controlled system employing an electric motor for operating each of the shunt valves 15. In this arrangement the same relation of shunt valves 15, electric motor 75 and motor switch 78 may be employed as previously described, this relation between these three elements being therefore only illustrated diagrammatically. The control point is broadly designated 172, and is representative of an individual control point for its individual furnace bin, or is representative of a common control point from which all of the shunt valves in the entire system are controlled. At this control point is provided the usual pressure gauge calibrated to indicate the contents of its associated bin and, if desired, having an audible alarm circuit such as previously described. In lieu of the magnetic switch 106 for alternately placing current upon each of the selective wires 81 and 82 I employ in this embodiment a simple, manually operated switch 173 which has electrical connection at its pivot with the second feeder 80'. A contact 174 at one limit of throw of the switch is connected to the first selective wire 81, and a similar contact 175 is at the other limit of throw, is connected to the second selective wire 82. In the operation of this system, when the indicating gauge 112 signifies that a new charge of coal is required in its individual bin the switch 173 is thrown to energize the proper selective wire 81 or 82 to drive the motor 75 and place the valve 15 in shunting position. The motor switch 78 operates to automatically interrupt operation of the motor 75 when the valve reaches its proper position as above described. As the coal is being fed into the bin the rate of feed and the contents of the bin are immediately indicated at all times on the gauge 112, and when the proper charge has been fed to the bin the switch 173 is thrown to energize the second selective wire and thereby drive the motor 75 to revolve the valve 15 to its through position. The operation of the blowing tank may be controlled automatically through the provision of the control wire 42 with its several pairs of contact springs 99 and 100, as indicated in dotted line, or the blowing tank may be manually controlled from the control position 172, or from any other preferred control position.

In Figure 7 I have shown in diagrammatic form a second manually controlled system, characterized by the use of a fluid pressure motor for actuating each of the shunting valves 15. As above described, the control position 172 may be individual to each particular shunting valve, or it may be a common control point for all of the valves of the entire system. In this form, the rotary valve element of the valve 15 is provided with a flared or tapered valve passage 177 which is widened at its intake end to remain in communication with the admission port of the valve through a considerable angular movement of the valve. The other end of the valve passage is reduced to have selective communication with either the port leading to the continuing section of conveyor conduit 14 or to the port leading to the conduit 52 extending down to the bin. By this arrangement only a comparatively small angular movement of the valve is required in shifting the same from its through position to its shunting position and vice versa. An operating arm 178 has pin and slot connection with a piston rod 179 extending into the air cylinder 181. A piston 182 having connection with the piston rod 179 within the air cylinder is adapted to be reciprocated back and forth by the admission of compressed air into the opposite ends of the cylinder through ports 183 and 184. Leading from these two ports are pipe lines 185 and 186, respectively, which extend to the control point 172' where they have connection with the opposite ports 187 and 188 of a four-way valve 189. The two other ports 191 and 192 at right angles to the ports 187 and 188 are connected respectively to a source of compressed air by way of pipe 193, and to atmosphere. The valve is adapted to be operated by a hand lever 194 or the like. The usual form of indicating gauge 112 is associated with the valve 189 at this control point for indicating the condition of bin supplied by the valve 15. The valve 189 is operated to control the quantity of coal in its associated bin, which quantity is directly indicated by the gauge 112, in substantially the same manner as characteristic of the electrical mode of control.

Figure 8 illustrates a modified arrangement of blowing tank and control apparatus. This blowing tank 11' is similar in principle to that disclosed in Patent No. 1,348,010 issued to H. S. Kimber. In this construction the pulverized coal is fed into the blowing tank through a feeding pipe 141 in which is disposed suitable valve mechanism which operates to maintain an air tight seal under the air pressure in the blowing tank and which may be operated through a suitable control lever 142. Compressed air enters the top of the tank through a pipe 143, the tank, in the present instance, being maintained under pressure at all times, except, of course, during the operation of filling the tank with a fresh charge of coal. The compressed air and coal are discharged from the tank through a pipe 144 which extends down from the top of the tank to a point adjacent the floor of the tank. Directly under this pipe 144 and spaced therefrom is a cone 145. An outer curtain pipe 146 embraces the discharge pipe 144, this curtain pipe being spaced from the sides of the discharge pipe to permit the flow of the required quantity of air down between the discharge pipe 144 and curtain pipe 146 for conveying the coal out through the system. The curtain pipe 146 is arranged for vertical reciprocation along the discharge pipe 144, and is adapted to have valve cooperation with the cone 145 for admitting coal below the discharge pipe 144 or for excluding the coal therefrom. That is to say, by seating the end of the curtain pipe 146 upon the cone 145, the coal can be excluded from entering the discharge pipe 144, but raising the curtain pipe off of the cone a short distance the coal is allowed to enter below the discharge pipe 144 where it is caught and picked up by the current of air rushing down through the curtain pipe and up into the discharge pipe 144. The upper end of this discharge pipe connects with the conveyor conduit 14 in which is interposed a suitable plug valve 147 for controlling the discharge from the blowing tank. An operating shaft 148 enters the blowing tank through a suitable air tight bearing in the side wall thereof, and supports a forked arm 149, the ends of which engage between collars 151 on the upper end of the curtain pipe 146. The outer end of the shaft 148 mounts an operating arm 152 which is guided at its outer end in a vertically slotted yoke 153. This yoke comprises part of an operating rod 154 extending from an air cylinder 155 up to the operating arm 156 of the valve 147. A compression spring 157 is guided between lateral flanges along the edges of the slot 158 in the yoke, and the upper end of this spring bears against a boss 159 on the outer end of the operating arm 152. The air cylinder 155 is controlled by a conventional form of rotary valve 161 which is adapted to alternately place passages in communication with a compressed air port 162 or with an atmospheric port 163. Through the instrumentality of this valve, compressed air can be admitted either above or below the piston 164 to oscillate the rod 154 up or down in controlling the blowing tank. For manual operation the valve 151 is controlled by a lever 150 and for automatic control is controlled by a solenoid 166, the core of which has connection with a valve arm 168 which is normally retracted downwardly by a spring 169. The solenoid 166 has connection with the usual blowing tank control wires 41 and 42 which are energized in the manner described of the previous embodiment. Upon the energization of this solenoid, the valve 161 is oscillated to admit compressed air above the piston 164 and to vent the cylinder area below the piston to atmosphere. The resulting downward motion of the piston operates through the rod 154 and arm 156 to open the valve 147. The curtain pipe 146 is at this time in its descended position upon the cone 145, and, owing to the lost motion relation between the yoke 153 and arm 152 the valve 147 is opened somewhat in advance of the raising of the curtain pipe 146. Consequently, a scavenging charge of compressed air is permitted to flow down through the curtain pipe 146 and up through the discharge pipe 144 and out through the valve 147 for scavenging the conveyor conduit preliminary to admitting the actual charge of coal. Continued downward motion of the rod 154 and yoke 153 moves the valve 147 to completely opened position and brings the upper end of the slot 157 against the boss 158, thereby oscillating the arm 152 and raising the curtain pipe 146. Thereupon, the pulverized coal is free to descend under the bottom of the discharge pipe 144 where it is picked up and carried out through the conduit to the point of consumption. When the demand has been supplied, the de-energization of the solenoid 166 permits the return of the valve 161 to its original position, thereby forcing the piston 164 upwardly and restoring the curtain pipe 146 and valve 147 to their closed positions. The operating arm 162 has a relatively small operating motion, and consequently, this arm operates to seat the curtain pipe 146 on the cone 145 so as to exclude further admission of coal before the valve 147 is closed. As a result, a scavenging charge of air is also admitted at this point in the cycle to clean out the conveyor conduit of any residue tending to lodge therein, particularly at the elbows and corners of the conduit. The continued upward motion of the rod 154 operates to finally close the valve 147, the relative motion between the yoke 153 and arm 152 compressing the spring 157 which insures a firm seating of the curtain pipe 146 on the cone 145. Where a delayed action is desired for longer periods of scavenging, the admission of the compressed air into the air cylinder 155 may be restricted, or the discharge through the atmospheric port 163 may be restricted, for a comparatively slow reciprocation of the piston 164.

Without further analysis, the foregoing will so fully reveal the gist of this invention that others can by applying current knowledge readily adapt it to various applications for either automatic or manual control without omitting certain features that, from the standpoint of the prior art, fairly constitute essential characteristics of the generic or specific aspects of the invention and therefore, such adaptations should and are intended to be comprehended within the meaning and the range of equivalency of the following claims.

I claim:

1. In combination, a receiving receptacle, means for feeding a material thereto, automatically operated control means for controlling said feeding means when the supply of material in said receptacle changes through a predetermined quantity, a body of fluid subjected to the weight of the material in said receptacle, and a pressure responsive member influenced by the pressure in said body of fluid for actuating said automatically operated control means.

2. In combination, a receiving receptacle, a conduit for feeding a material thereto, valve means for controlling the feed of material to said receptacle, automatic means comprising a body of fluid subjected to the weight of the material in said receptacle and a pressure actuated member responsive to the pressure in said body of fluid adapted to automatically control the operation of said valve means when the supply of material in said receptacle falls below a predetermined minimum.

3. In combination, a receiving receptacle, a discharging receptacle, a conduit connecting the two receptacles, a valve in said conduit, means for initiating the flow of the material from said discharging receptacle to said receiving receptacle, a body of fluid subjected to the weight of the material in said receiving receptacle for indicating the charge therein, control means for said valve adapted to be actuated in accordance with the measured determinations of the quantity of material in said receiving receptacle by said body of fluid for controlling said valve, and a second control means adapted to be operated in accordance with the measured determinations of the charges of material in said receiving receptacle by said body of fluid for controlling the operation of said flow initiating means.

4. In combination, a receiving receptacle, a discharging receptacle, a conduit connecting the two, a valve in said conduit, means adapted to initiate a flow of air from said discharging receptacle to convey a material to said receiving receptacle, a body of fluid subjected to the weight of the material in said receiving receptacle, indicating means responsive to the pressure in said body of fluid for indicating the quantity of material, in said receiving receptacle, a first control means adapted to be operated to actuate said valve in accordance with the indicated pressure in said body of fluid, and a second control means adapted to be actuated for controlling said flow initiating means in accordance with the indicated pressure in said body of fluid.

5. In combination, a receiving receptacle, a discharging receptacle, a conduit connecting the two, a valve in said conduit, means for creating a flow of air from said discharging receptacle to convey a material therefrom to said receiving receptacle, and a body of fluid subjected to the weight of the material in said receiving receptacle and operative to automatically control the position of said valve and the operation of said flow creating means in accordance with the quantity of material in said receiving receptacle.

6. In a pulverized coal transport system, the combination of a receiving bin, a blowing tank, a conduit connecting the two, a valve in said conduit for controlling the feed of coal to said receiving bin, aspirating means for creating a flow of air from said blowing tank to convey the coal to said receiving bin, a body of fluid subjected to the weight of the material in said receiving bin, means responsive to the pressure in said body of fluid for indicating the quantity of material in said bin, a first control means for controlling the position of said valve, a second control means for controlling the operation of said aspirating means, said first and second control means being automatically actuated in accordance with pressure created in said body of liquid.

7. In a pulverized coal transport system, the combination of a receiving bin, a blowing tank, a conduit extending from said blowing tank to said receiving bin, a valve in said conduit, blowing means for initiating and maintaining a flow of coal from said blowing tank into said conduit, and electrically controlled means responsive to the charge of coal in said receiving bin for automatically controlling the opening and closing of said valve and the starting and stopping of said blowing means.

8. In a pulverized coal transport system, the combination of a receiving bin, a blowing tank, a conduit extending from said blowing tank to said receiving bin, a valve in said conduit, blowing means for causing a flow of coal from said blowing tank into said conduit, automatically controlled means responsive to the quantity of coal in said receiving bin for opening and closing said valve, and automatically controlled means responsive to the position of said valve for controlling the starting and stopping of said blowing means.

9. In a pulverized coal transport system, the combination of a receiving bin, a blowing tank, a conduit connecting said blowing tank with said receiving bin, a valve in said conduit, blowing means for causing a flow of coal from said blowing tank into said conduit, electrical means for automatically opening and closing said valve in response to the quantity of coal in said receiving bin, and electrical means responsive to the positions of said valve for automatically starting and stopping said blowing means.

10. In a pulverized coal transport system, the combination of a receiving bin, a blowing tank, a conduit extending between said blowing tank and receiving bin, blowing means for causing a flow of coal from said blowing tank to said receiving bin, a shunting valve in said conduit, and means controlled by the position of said valve for starting and stopping said blowing means.

11. In a pulverized coal transport system, a plurality of receiving bins disposed at points remote from one another, a storage receptacle from which coal is delivered to the receiving bins, conduit means connecting the receptacle with each of the bins, a valve for each bin controlling the discharge of coal from the conduit means to said bin, control means operable at a control point to open and close said valves independently of one another, means for causing a flow of coal from the storage receptacle through the conduit means to the bins, and means for stopping said coal-moving means actuated by the quantity of material in the bin to which the coal is being delivered.

12. In combination, a plurality of receiving bins, common means for feeding material thereto, conduit means connecting said feeding means to the bins, means brought into operation by the quantity of material in any one of said bins for starting said feeding means when the material in said bin falls below a predetermined minimum, and means for stopping said feeding means actuated by the weight of material in said bin being supplied when the quantity of material therein exceeds a predetermined maximum.

13. In a pulverized coal transport system, a receiving bin, a conveyor conduit leading thereto, means for causing a movement of coal through the conduit to the bin, a valve in the conduit controlling communication through the conduit to the bin, motor means at the valve for opening and closing the latter, control means for the starting and stopping of the motor operable at a point remote from the motor, and means actuated by the movement of the valve to open or closed position for starting and stopping the coal-moving means.

14. In a pulverized coal transport system, the combination of a receiving bin, a source of supply for feeding coal thereto, a conduit extending between said source of supply and said bin, means for causing a movement of coal through said conduit, a valve in the conduit controlling the discharge of coal in the bin, and electrical control means responsive to the charge of coal in the receiving bin and opening and closing said valve as the charge in said bin falls below or exceeds selected limits, said electrical control means also starting said coal-moving means as the valve is opened and stopping said coal-moving means as the valve is closed.

15. In a pulverized coal transport system, the combination of a receiving bin, a conduit leading thereto, means for causing a movement of coal through the conduit to the bin, a valve in the conduit for controlling the flow of material therefrom into the bin, a motor for opening and closing the valve, automatic switch mechanism controlled by the valve for placing the motor in condition for rotation in opposite directions, and means responsive to the quantity of material in the bin for connecting said motor to a source of energy through said switch mechanism.

16. In a pulverized coal transport system, the combination of a receiving bin, a supply receptacle for coal, a conduit extending from the supply receptacle to the receiving bin, means for causing a flow of coal from said receptacle to said bin, a valve in the conduit controlling the flow of material to the bin, and means controlled by the position of the valve for starting and stopping said coal-moving means.

17. In a pulverized coal transport system, a plurality of receiving bins, a storage receptacle for holding coal to be delivered to the bins, conduit means extending from the storage receptacle to the bins, valve means in the conduit means for controlling the flow to the respective bins, control means at a common control point operable to open and close the valves, and means responsive to the quantity of coal in the individual bins for operating said control means.

18. In a pulverized coal transport system, the combination of a supply tank, a plurality of receiving bins, conduit means extending from the supply tank to the bins, means for propelling coal from the supply tank through the conduit means to the receiving bins, a valve in the conduit associated with each bin for directing coal from the conduit to that bin, control means at a point remote from the bins for controlling the operation of the propelling means, said control means being operatively connected with the valves to cause the propelling means to start when a valve is open and to stop when all the valves are closed, and control means at the same control point operable to open and close the valves.

19. In a transport system for pulverulent material, the combination of a supply tank, a receiving bin, a conduit extending from the supply tank to the bin, a valve controlling the communication between the conduit and the bin, means at a point remote from the bin responsive to the weight of the material in the bin and operable to open and close the valve as the quantity of material in the bin falls below or exceeds selected limits, means for causing a movement of material through the conduit from the supply tank to the bin, and means controlled by said valve and in turn controlling the operation of said means last mentioned.

20. In a transport system for pulverulent material, the combination of a supply receptacle, a receiving bin, a conduit from the receptacle to the bin, a valve in the conduit controlling communication between the conduit and bin, means operable at a point remote from the bin for opening and closing the valve, means for propelling material through the conduit, and means for controlling the propelling means and operated by said valve, said valve causing said control means to start the propelling means when the valve has moved from closed to full open position and to stop the propelling means when the valve starts to move toward closed position.

In witness whereof, I hereunto subscribe my name this 17th day of March, 1921.

JAMES HALL TAYLOR.